United States Patent
Nishikawa et al.

(10) Patent No.: US 10,862,354 B2
(45) Date of Patent: Dec. 8, 2020

(54) THIN STRIP COMPONENT, METHOD FOR MANUFACTURING SAME, AND MOTOR USING THIN STRIP COMPONENT

(71) Applicant: Panasonic Corporation, Osaka (JP)

(72) Inventors: Yukio Nishikawa, Osaka (JP); Hideaki Hamada, Hyogo (JP); Naoki Nojiri, Osaka (JP)

(73) Assignee: PANASONIC CORPORATION, Osaka (JP)

(*) Notice: Subject to any disclaimer, the term of this patent is extended or adjusted under 35 U.S.C. 154(b) by 0 days.

(21) Appl. No.: 16/268,455

(22) Filed: Feb. 5, 2019

(65) Prior Publication Data

US 2019/0173329 A1 Jun. 6, 2019

Related U.S. Application Data

(63) Continuation of application No. PCT/JP2018/001498, filed on Jan. 19, 2018.

(30) Foreign Application Priority Data

Feb. 14, 2017 (JP) ................................ 2017-025234

(51) Int. Cl.
*H02K 1/06* (2006.01)
*H02K 1/02* (2006.01)
(Continued)

(52) U.S. Cl.
CPC ............. *H02K 1/02* (2013.01); *C21D 8/0215* (2013.01); *C21D 8/0247* (2013.01);
(Continued)

(58) Field of Classification Search
CPC .......... H02K 1/02; H02K 1/146; H02K 1/185; H02K 15/022
See application file for complete search history.

(56) References Cited

U.S. PATENT DOCUMENTS 6,331,363 B1    12/2001 DeCristofaro et al.
6,784,588 B2 *  8/2004 Decristofaro ....... H01F 1/15366
                                                   310/216.065
(Continued)

FOREIGN PATENT DOCUMENTS

CN    1596321 A    3/2005
EP    1473377 A1   11/2004
(Continued)

OTHER PUBLICATIONS

International Search Report of PCT application No. PCT/JP2018/001498 dated Apr. 24, 2018.
(Continued)

*Primary Examiner* — Thanh Lam
(74) *Attorney, Agent, or Firm* — McDermott Will & Emery LLP (57) ABSTRACT

A method for manufacturing a thin strip component, including a processing step of processing an amorphous thin strip member into a dimension shape larger than a target shape, and a heat treating step of heat treating and contracting the amorphous thin strip member processed in the processing step to form the amorphous thin strip member into a thin strip component of the target shape. A thin strip component which is a magnetic laminate in which a plurality of plate-shaped thin strip component members of the same shape are laminated, and has a recess over an entire side surface of the magnetic laminate is used. A motor including the thin strip component, a plurality of coils disposed on the thin strip component, and a rotor disposed between the plurality of coils is used.

18 Claims, 9 Drawing Sheets

(51) Int. Cl.
  *C21D 8/12* (2006.01)
  *C21D 9/00* (2006.01)
  *C21D 8/02* (2006.01)
  *H01F 41/02* (2006.01)
  *H02K 1/14* (2006.01)
  *H02K 1/18* (2006.01)
  *H02K 15/02* (2006.01)
  *C21D 8/04* (2006.01)

(52) U.S. Cl.
  CPC ........... *C21D 8/0252* (2013.01); *C21D 8/125* (2013.01); *C21D 8/1211* (2013.01); *C21D 8/1244* (2013.01); *C21D 9/0068* (2013.01); *H01F 41/0213* (2013.01); *H02K 1/146* (2013.01); *H02K 1/185* (2013.01); *H02K 15/022* (2013.01); *C21D 8/0415* (2013.01); *C21D 2201/03* (2013.01)

(56) References Cited

U.S. PATENT DOCUMENTS

| | | | | |
|---|---|---|---|---|
| 7,235,910 | B2* | 6/2007 | Decristofaro | H01F 1/15375 310/216.065 |
| 8,198,973 | B2* | 6/2012 | Fukui | H01F 27/25 336/219 |
| 8,680,736 | B2* | 3/2014 | Wang | H02K 1/14 310/216.045 |
| 8,729,748 | B2* | 5/2014 | Ueno | H02K 1/148 310/43 |
| 8,941,457 | B2* | 1/2015 | Yan | H01F 5/003 336/200 |
| 8,943,677 | B2* | 2/2015 | Gerster | C22C 38/14 29/609 |
| 9,437,355 | B2 | 9/2016 | Lee et al. | |
| 9,493,866 | B2 | 11/2016 | Otsuka et al. | |
| 10,630,153 | B2* | 4/2020 | Hasuo | H02K 15/022 |
| 2005/0089708 | A1 | 4/2005 | Maruko et al. | |
| 2011/0253899 | A1 | 10/2011 | Urushiyama et al. | |
| 2017/0229237 | A1 | 8/2017 | Makino et al. | |
| 2018/0166213 | A1 | 6/2018 | Makino et al. | |
| 2019/0157921 | A1* | 5/2019 | Nishikawa | H02K 15/02 |
| 2019/0181700 | A1* | 6/2019 | Nishikawa | H01F 27/245 |

FOREIGN PATENT DOCUMENTS

| | | |
|---|---|---|
| JP | 4-260310 | 9/1992 |
| JP | 5-003126 | 1/1993 |
| JP | 6-145917 | 5/1994 |
| JP | 2000-352646 | 12/2000 |
| JP | 2002-529929 | 9/2002 |
| JP | 2003-229654 | 8/2003 |
| JP | 2011-052179 | 3/2011 |
| JP | 2014-514761 | 6/2014 |
| JP | 2014-167953 | 9/2014 |
| JP | 2016-197720 | 11/2016 |
| WO | 2017/006868 A1 | 1/2017 |

OTHER PUBLICATIONS

The Extended European Search Report dated Oct. 29, 2019 for the related European Patent Application No. 18754785.6.

English Translation of Chinese Search Report dated Mar. 16, 2020 for the related Chinese Patent Application No. 201880003262.X.

* cited by examiner

THIN STRIP COMPONENT, METHOD FOR MANUFACTURING SAME, AND MOTOR USING THIN STRIP COMPONENT

TECHNICAL FIELD

The technical field relates to a thin strip component, a method for manufacturing the same, and a motor using the thin strip component. In particular, the technical field relates to a thin strip component obtained by heat treating a soft magnetic thin strip, a method for manufacturing the same, and a motor using the same.

BACKGROUND

As a laminate of magnetic plates of an iron core (stator) for a motor in the related art, pure iron or an electromagnetic steel plate is used. In motors aimed for higher efficiency, amorphous thin strips or thin strips having nanocrystal grains are used in some iron cores (for example, see Japanese Patent Unexamined Publication No. 6-145917).

A stator core used in this motor is, first, an amorphous alloy thin strip produced by a liquid quenching method such as a single roll method or a twin roll method is processed into a predetermined shape by a method such as winding, cutting, punching, and etching. Next, in order to improve the magnetic characteristics of the alloy thin strip, the amorphous alloy thin strip is heat treated and crystallized to obtain an alloy thin strip having nanocrystal grains. Next, these are laminated to form a stator core, and used for a motor.

SUMMARY

However, in the motor disclosed in Japanese Patent Unexamined Publication No. 6-145917, since the amorphous alloy thin strip is processed into a predetermined shape and heat treated, the distance between atoms constituting the thin strip is narrowed as the temperature rises, and contraction of the thin strip occurs.

As a result, the shape of the stator core after the heat treatment sometimes does not fall within a predetermined range. Therefore, troubles have occurred in assembling the stator to the motor. A gap distance between the stator core and a rotor core was not constant, and the motor characteristics were not constant.

Therefore, an object of the disclosure is to provide a thin strip component excellent in shape accuracy and magnetic characteristics even if the contraction occurs in the thin strip component by heat treatment, a method for manufacturing the same, and a motor using the thin strip component.

In order to achieve the above-described object, a method for manufacturing a thin strip component including a processing step of processing an amorphous thin strip member into a dimension shape larger than a target shape, and a heat treating step of heat treating and contracting the amorphous thin strip member processed in the processing step to form the amorphous thin strip member into a thin strip component of the target shape is used.

A method for manufacturing a thin strip component including a processing step of processing an amorphous thin strip into a dimension shape larger than a target shape, a laminating step of laminating the amorphous thin strips processed in the processing step, and a heat treating step of heat treating and contracting a laminate of the amorphous thin strips after the laminating step to form the amorphous thin strips into a laminated thin strip member of the target shape is used.

A thin strip component which is a magnetic laminate in which a plurality of plate-shaped thin strip component members of the same shape are laminated, and has a recess over an entire side surface of the magnetic laminate is used.

A thin strip component which is a magnetic laminate in which a plurality of plate-shaped thin strip component members of the same shape are laminated, and to which the thin strip components are bonded is used.

A thin strip component which is a magnetic laminate in which a plurality of plate-shaped thin strip component members of the same shape are laminated, in which one plane is formed by covering a side surface of the magnetic laminate with resin is used.

A thin strip component which is a magnetic laminate in which a plurality of plate-shaped thin strip component members of the same shape are laminated, in which one plane is formed on a side surface of the magnetic laminate, and resin is positioned between the thin strip components is used.

A motor including the above-described thin strip component, a plurality of coils disposed on the thin strip component, and a rotor disposed between the plurality of coils is used.

As described above, according to the thin strip component, the laminate, the method for manufacturing thereof, and the motor of the disclosure, it is possible to improve the shape accuracy and the magnetic characteristics of the thin strip component, and the motor characteristics.

DESCRIPTION OF EMBODIMENTS

Hereinafter, embodiments of the disclosure will be described with reference to the drawings.

Embodiment 1

Figure 1:
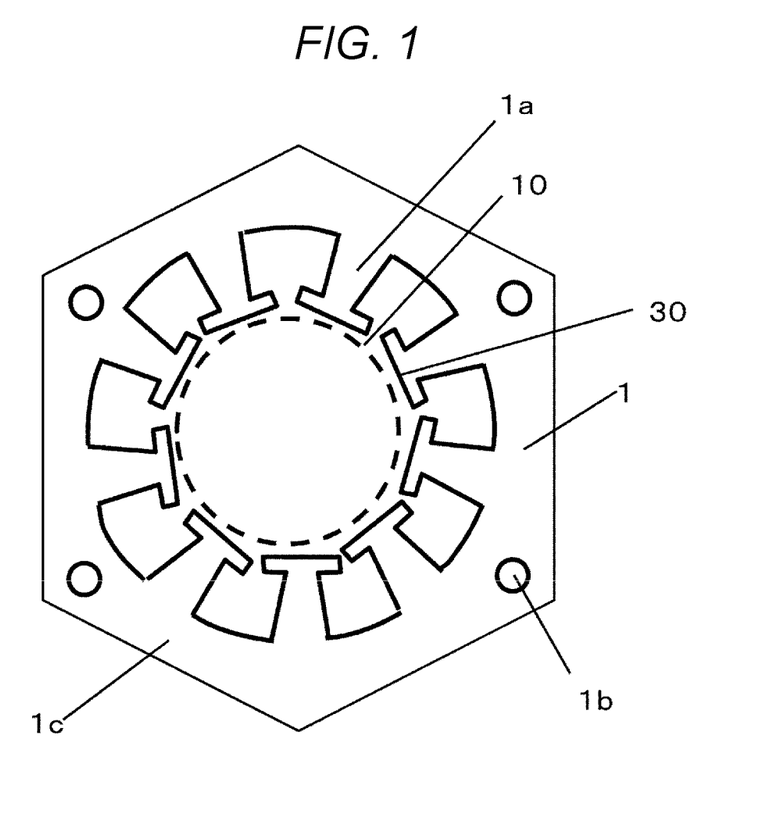
FIG. 1 is a top view of an iron thin strip component in an amorphous state according to Embodiment 1 of the disclosure.

FIG. 1 is a plan view of amorphous thin strip member 1 according to Embodiment 1 of the disclosure.
Amorphous Thin Strip Member 1

Amorphous thin strip member 1 is an iron thin strip component, a magnetic member.

Amorphous thin strip member 1 has a plurality of T-shaped portions called teeth 1a on an inner side. In a case where amorphous thin strip member 1 is used for a motor, rotor 10 is placed on the inner side of end surface 30 of teeth 1a. Finally, coils are wound on these teeth 1a. A current flows through the coils, a magnetic field is generated, rotor 10 rotates, and becomes a motor.

There are fitting holes 1b at four positions around amorphous thin strip member 1. A fixing member such as a bolt is inserted into each fitting hole 1b.

There is donut-like or hollow frame-shaped core back 1c which connects a plurality of teeth 1a and has the fitting holes 1b on an outer periphery of amorphous thin strip member 1.
Heat Treatment Amorphous thin strip member 1 is heat treated to improve magnetic characteristics. In particular, when fine crystal grains of pure iron called nanocrystal grains are generated by being crystallized in the heat treatment, soft magnetic characteristics are improved. Amorphous thin strip member 1 is a magnetic material, the coils are wound, and becomes a component of the motor.

Since amorphous thin strip member 1 is in an unstable state in which the interatomic distance is longer than the unique interatomic distance, atoms move so that the interatomic distances become unique distances for stabilization as the temperature rises due to the heat treatment. As a result, amorphous thin strip member 1 contracts. Since the heat treated thin strip becomes brittle, at the time of manufacturing, it is necessary to perform a shaping process in the amorphous state, and then move onto the heat treating step.
Process In Embodiment 1, a method for manufacturing a thin strip component including a processing step of processing amorphous thin strip member 1 into a predetermined shape having a ratio of a dimension larger than a target shape, and a heat treating step of heat treating and contracting processed amorphous thin strip member 1 into a shape within a target dimension is used.

That is, amorphous thin strip member 1 is processed to a large dimension in consideration of the contraction factor of amorphous thin strip member 1 due to the heat treatment. Amorphous thin strip member 1 processed to be larger is heat treated, contracted, and contained within the predetermined dimensional specification. In amorphous thin strip member 1, the movement of atoms becomes clear from about 100° C., and nanocrystal grains having a size of several tens of nanometers begin to be generated between about 370° C. to 500° C.

It takes several seconds or more for the treatment time to improve the magnetic characteristics, so the lower the temperature the longer it takes. The contraction factor is 0.6% at maximum in the uniaxial direction for a rectangular test piece, but the value varies depending on the heat treatment conditions. As the temperature of the heat treatment is higher or the heat treatment is longer, the movement amount of the atoms becomes larger, so that the contraction factor becomes larger.

The processing dimension is decided accordingly. Regarding the contraction factor, the influence of plate thickness is small. On the other hand, regarding the contraction factor, the influence of the shape is large, and the behavior of the contraction factor depending on the location is complicated depending on the shape. Since not only the contraction factor of each material itself but also the manner of connection of the materials are mutually restrained, the contraction factor is not uniform and varies from place to place.

It is the T-shaped portion that is teeth 1a which needs to consider the contraction factor in order to improve the shape accuracy. A rotor, which is rotor 10, is inserted into the inner diameter portion. Therefore, when a gap between rotor 10 and end surface 30 of teeth 1a is large, the motor efficiency is deteriorated, and when the gap is not constant, the rotation operation becomes unstable.

End surface 30 of a tip portion of teeth 1a shows the most complicated contraction behavior. If the shape accuracy of teeth 1a is poor, the motor characteristics also become unstable.

There are fitting holes 1b at four positions around amorphous thin strip member 1. The position of each fitting hole 1b is important because it affects the positional accuracy of the center of amorphous thin strip member 1 and the accuracy of a diameter of a space into which rotor 10 is inserted.

Figure 2A:
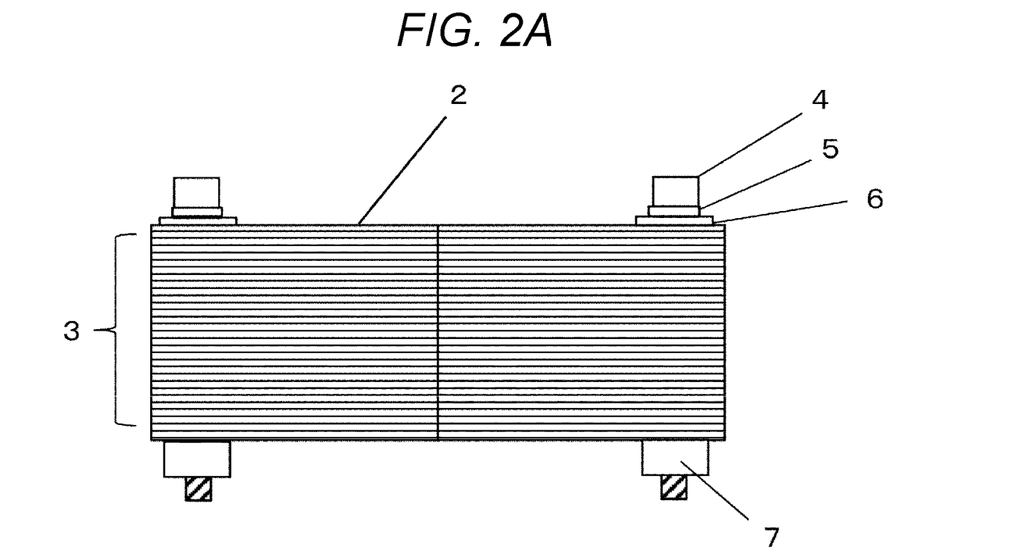
FIG. 2A is a side view of a laminate in which heat treated thin strip components are laminated according to Embodiment 1 of the disclosure.
Figure 2B:
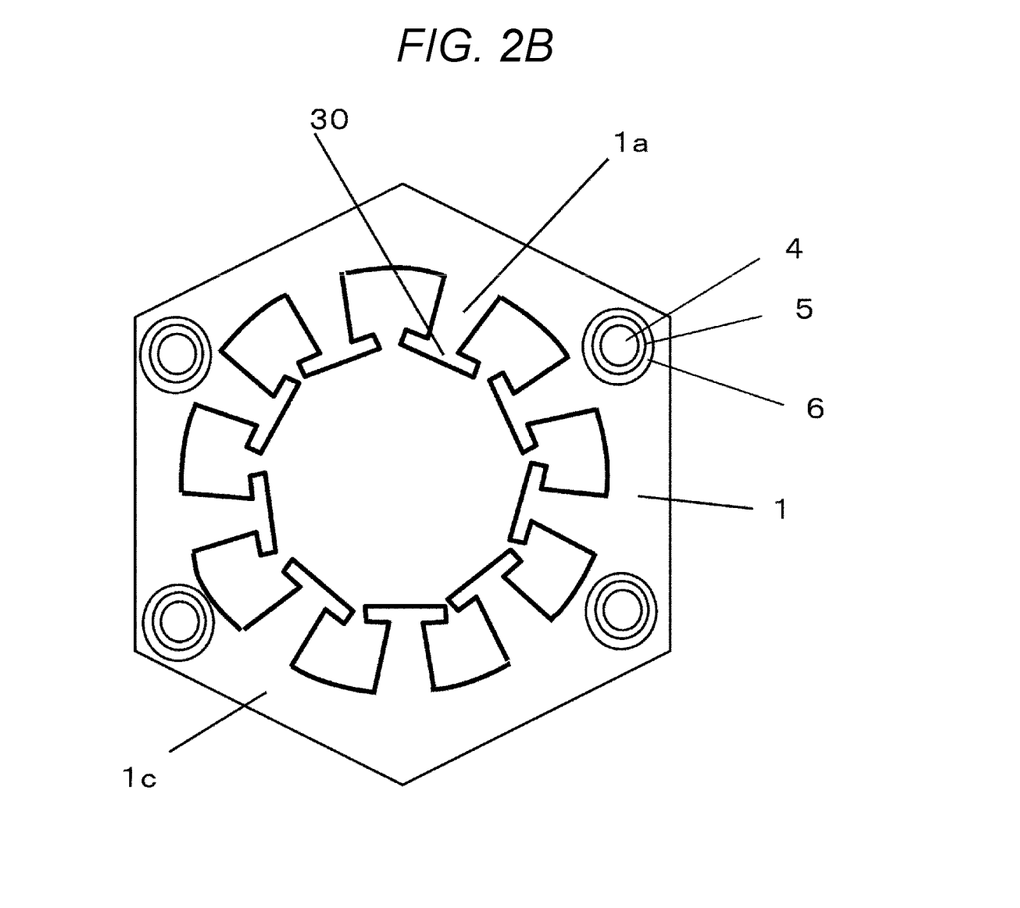
FIG. 2B is a top view of the laminate in which the heat treated thin strip components are laminated according to Embodiment 1 of the disclosure.

There is donut-like or hollow frame-shaped core back 1c which connects the plurality of teeth 1a and has fitting hole 1b. The accuracy of core back 1c may be lower than that of teeth 1a or fitting hole 1b in terms of the degree of rigidity.
Process Therefore, a shape close to the final shape is produced first, and heat treated. The ones subjected to heat treatment are measured and the contraction factor is determined. The contraction factor measured with different heat treatment conditions and the portion shape is between 0% to 0.6%. The contraction amount after the heat treatment is influenced by the nonuniformity such as the amorphous state in amorphous thin strip member 1, the plate thickness, the temperature during the heat treatment, and the like. There is a difference in the contraction amount even if the same treatment is carried out. However, if the maximum diameter is about 130 mm or less as in this embodiment, the accuracy is within ±0.01 mm.
Laminate FIG. 2A is a side view of thin strip component 3 in which thin strip component members 2 obtained by heat treating amorphous thin strip member 1 are laminated. FIG. 2B is a top view of thin strip component 3 in which thin strip component members 2 obtained by heat treating amorphous thin strip member 1 are laminated. In laminated thin strip component 3, heat treated thin strip component members 2 are laminated and fastened by nut 7 via spring washer 5 and washer 6 by bolt 4. Here, the fixation is four positions.

After laminating a plurality of or more amorphous thin strip members 1, amorphous thin strip members 1 may be heat treated and fastened by bolt 4 as shown in FIG. 2A to form laminated thin strip component 3.

Laminated thin strip component 3 is a magnetic laminate in which a plurality of plate-shaped thin strip component members 2 of the same shape are laminated.

Motor

Figure 3A:
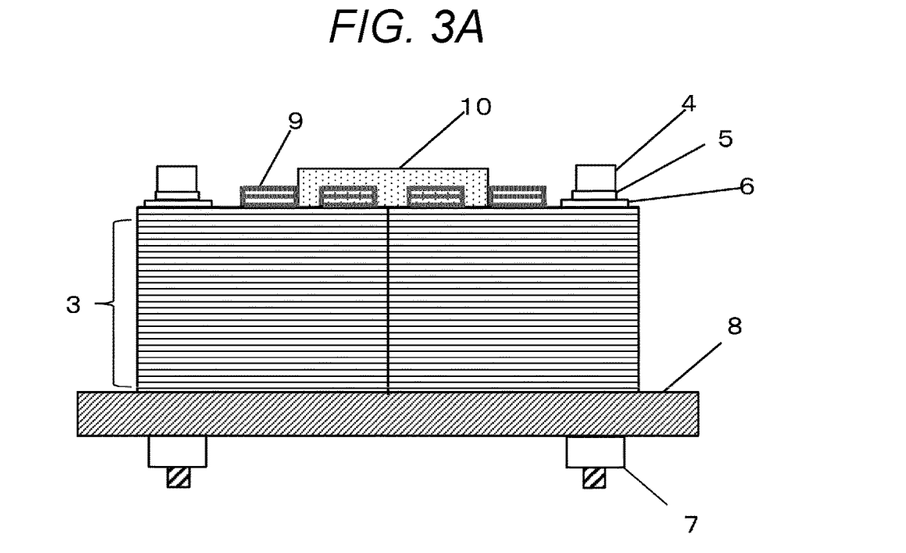
FIG. 3A is a side view of a motor using the laminate according to Embodiment 1 of the disclosure.
Figure 3B:
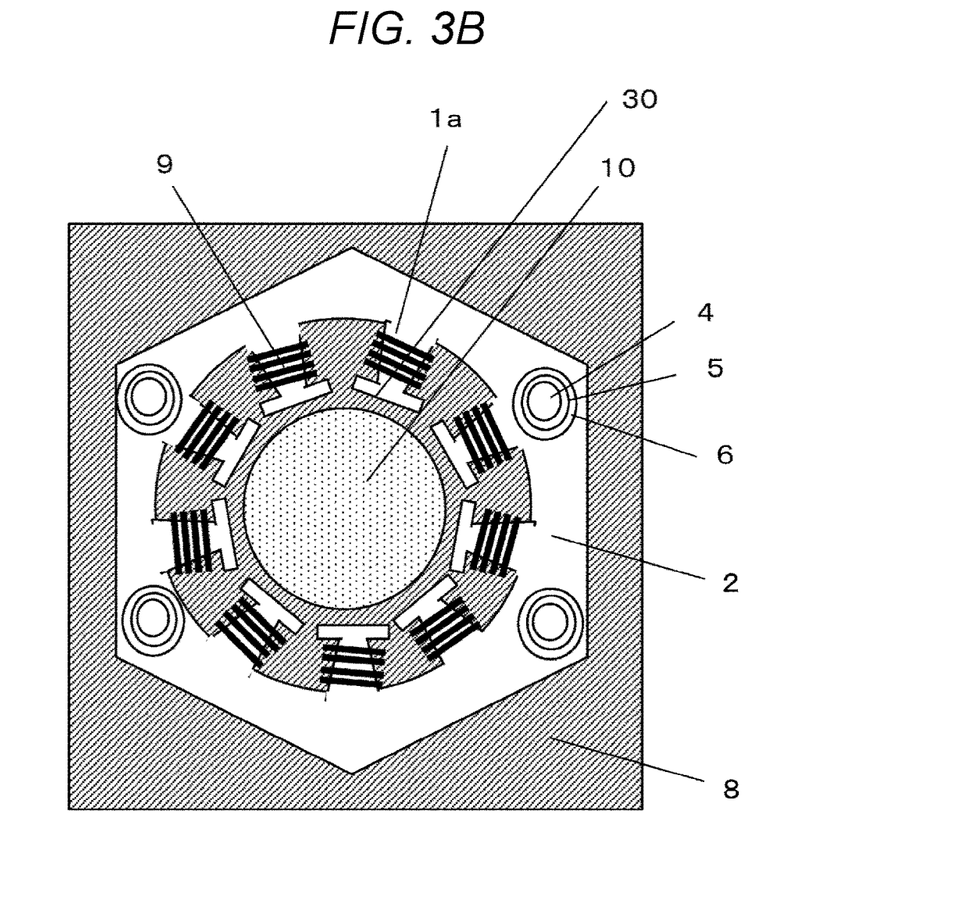
FIG. 3B is a top view of the motor using the laminate according to Embodiment 1 of the disclosure.

FIG. 3A is a side view of a motor using laminated thin strip component 3, and FIG. 3B is a top view of the motor using laminated thin strip component 3. In laminated thin strip component 3 of FIGS. 2A and 2B, nut 7 is removed at one end, metal base 8 is inserted under laminated thin strip component 3 and fastened again by nut 7.

Next, winding 9 is applied to laminated thin strip component 3 at a portion called teeth 1*a* (FIG. 1) of thin strip component member 2 to make it a stator. Rotor 10 is installed in the inner diameter portion of laminated thin strip component 3. If electricity is supplied to winding 9 in this state, it can be driven as a motor.

Teeth 1*a*

Figure 4A:
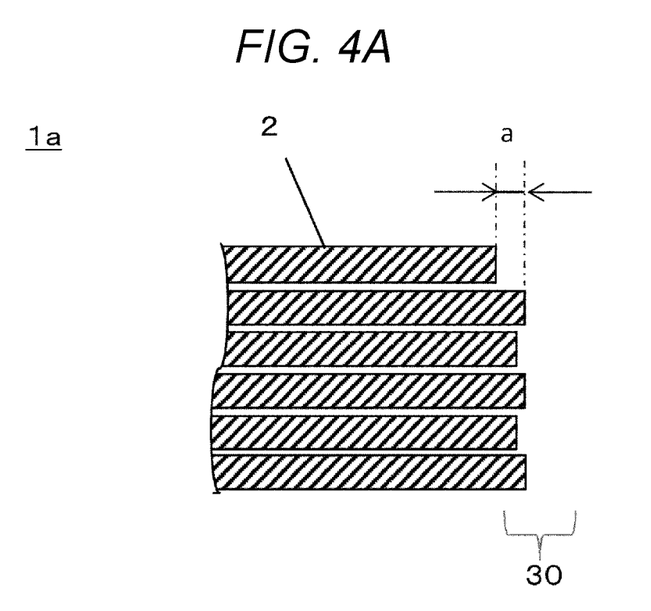
FIG. 4A is a cross-sectional view of a vicinity of end surface of teeth of the laminate according to Embodiment 1 of the disclosure.
Figure 4B:
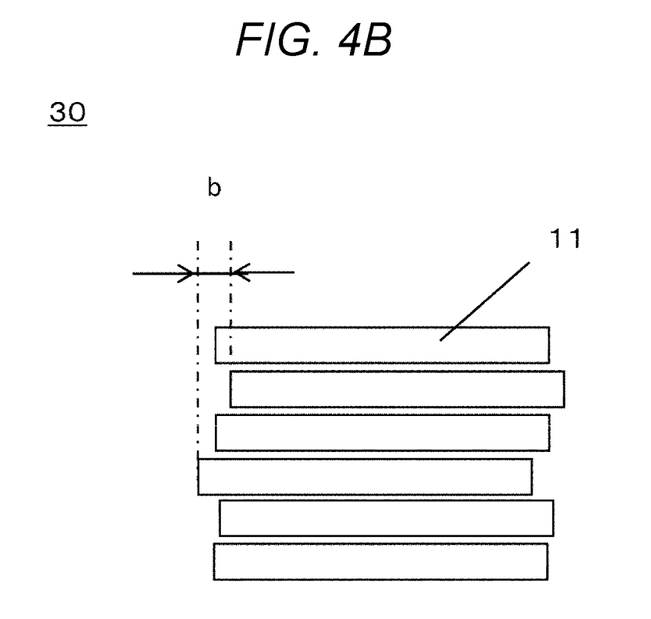
FIG. 4B is a front view of the teeth of the laminate according to Embodiment 1 of the disclosure.

FIG. 4A is a cross-sectional view of a vicinity of end surface 30 of teeth 1*a* of laminated thin strip component 3, and FIG. 4B is a front view of a vicinity of end surface 30 of teeth 1*a* of laminated thin strip component 3.

As described in FIG. 1, the dimensional accuracy of thin strip component member 2 after heat treatment is within ±0.01 mm. In addition, misalignment in the plane tends to occur during the lamination. Even if the accuracy of the alignment is increased, unevenness occurs on end surface 30 due to the deviation of the dimensions caused by the heat treatment.

Dimensional variations a of the unevenness of FIG. 4A and dimensional variation of end surface 30 in dimensional variation b of the unevenness of FIG. 4B are both within ±0.1 mm. Since thin strip component member 2 is heat treated, it is possible to confirm visible oxide film 11 on end surface 30 in FIG. 4B. Oxidation does not progress and corrosion resistance improves due to the presence of oxide film 11.

Embodiment 2

Figure 5:
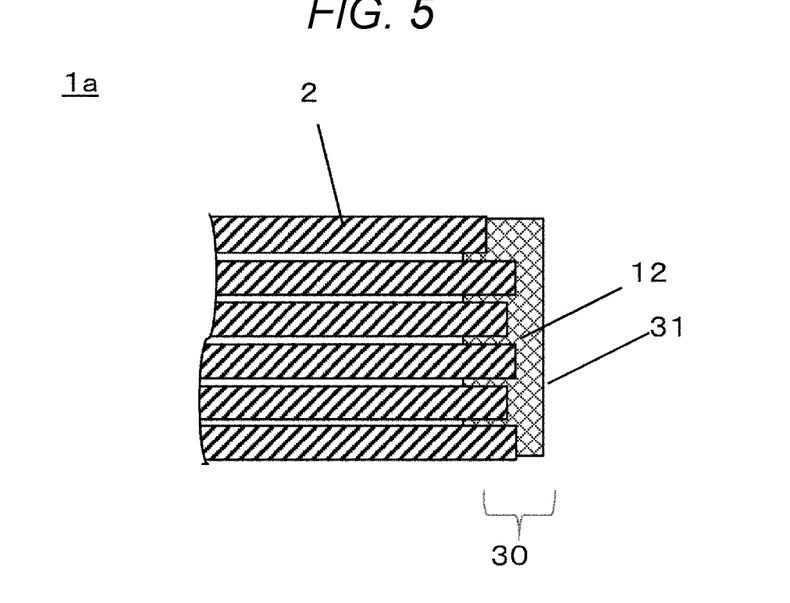
FIG. 5 is a cross-sectional view of a vicinity of an end surface of a laminate according to Embodiment 2 of the disclosure.

FIG. 5 is a cross-sectional view of a vicinity of end surface 30 of teeth 1*a* of laminated thin strip component 3 according to Embodiment 2 of the disclosure. Items not described are the same as those in Embodiment 1.

FIG. 5 is different from FIG. 4 in Embodiment 1 in that resin coating layer 12 is formed on end surface 30 of thin strip component members 2. Unevenness occurs on end surface 30 due to the difference in contraction amount of each thin strip component member 2. However, it is particularly important to improve the accuracy of mutual gap distance (distance between end surface 30 and rotor 10) in the inner diameter portion in which rotor 10 is rotated.

In order to solve the dimensional difference, resin coating layer 12 is formed on end surface 30. When resin coating layer 12 enters deeper into the interlayer of thin strip component members 2, the space factor becomes worse. Therefore, resin coating layer 12 is formed only on end surface 30 mainly. Since end surface 30 has unevenness, even if resin coating layer 12 is formed only in the vicinity of the surface of end surface 30, the bonding force can be sufficiently secured. Furthermore, if the surface of resin coating layer 12 is cut to form plane 31, the shape accuracy is further improved.

It is preferable to form resin coating layer 12 only on teeth 1*a* portion of thin strip component 3.

Embodiment 3

Figure 6A:
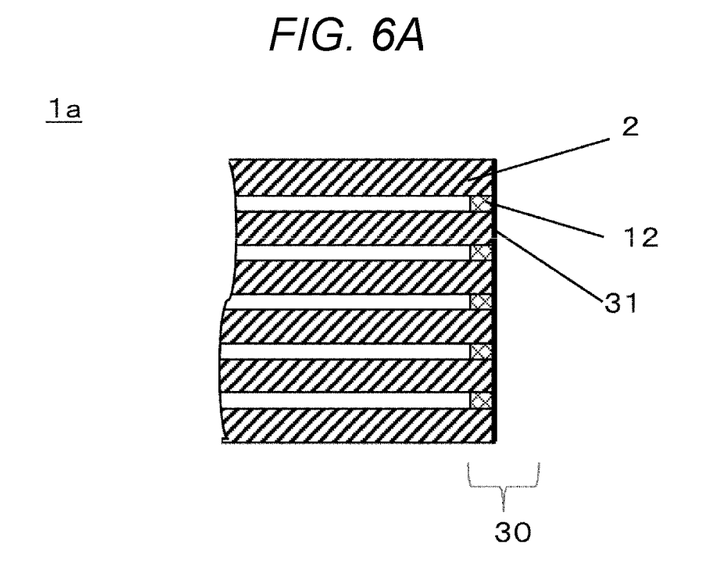
FIG. 6A is a cross-sectional view of a vicinity of an end surface of a laminate according to Embodiment 3 of the disclosure.
Figure 6B:
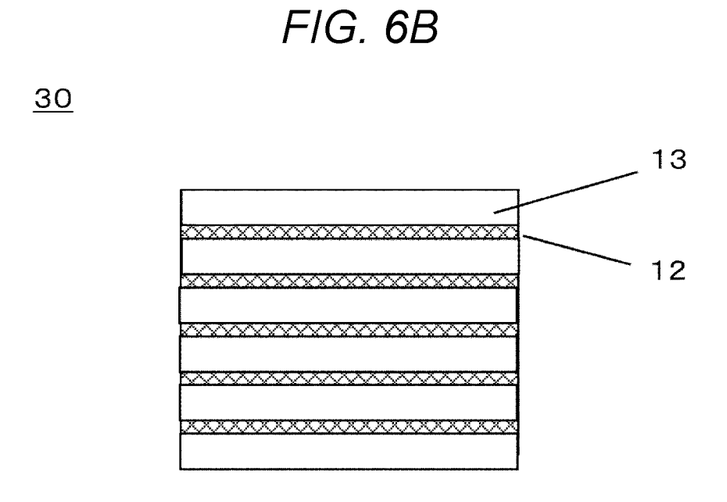
FIG. 6B is a front view of the vicinity of the end surface of the laminate according to Embodiment 3 of the disclosure.

FIG. 6A is a cross-sectional view of a vicinity of end surface 30 of teeth 1*a* of laminated thin strip component 3 according to Embodiment 3 of the disclosure. FIG. 6B is a front view of the vicinity of end surface 30 of teeth 1*a* of laminated thin strip component 3 according to Embodiment 3 of the disclosure. Items not described are the same as those in Embodiments 1 and 2.

FIG. 6A is different from FIG. 5 in Embodiment 2 in that the surface of resin coating layer 12 is cut to expose thin strip component members 2 from end surface 30 to form one plane 31. Although thin strip component members 2 can be brittle due to the heat treatment, by leaving a state in which the interlayer is bonded by resin coating layer 12 in end surface 30, it is possible to perform cutting without damaging thin strip component members 2.

By the cutting process, the unevenness amount of the cross section decreases, and cutting trace 13 having metallic luster remains as seen from the front.

This not only improves the accuracy of the gap distance between rotor 10 and end surface 30 in particular, but also makes it possible to reduce the gap distance with thin strip component members 2. As a result, the motor efficiency is further improved.

It is preferable to perform the above-described treatment only on teeth 1*a* portion of thin strip component 3.

Embodiment 4

Figure 7:
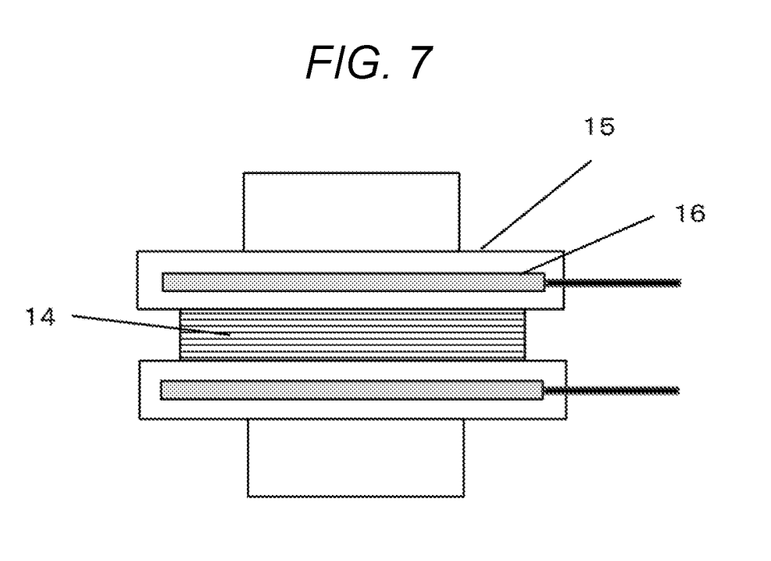
FIG. 7 is a view showing a cross-sectional configuration of a heat treatment device for a laminate according to Embodiment 4 of the disclosure.

FIG. 7 is a view showing a cross-sectional configuration of a heat treatment device of laminated thin strip component 3 according to Embodiment 4 of the disclosure. Items not described are the same as those in Embodiments 1 to 3.

Laminate 14 of amorphous thin strip members 1 is sandwiched between pressure plates 15, and heated by heater 16 in pressure plate 15 so as to perform heat treatment while pressing. During the heat treatment process, the surface of oxide film 32 develops between amorphous thin strip members 1, and the entire or a portion of the members are mutually bonded to each other. As a result, since laminate 14 is integrated, the handling after heat treatment becomes easier.

Oxide film 32 is larger on the outside of laminate 14 than between inside amorphous thin strip member 1.

Figure 8A:
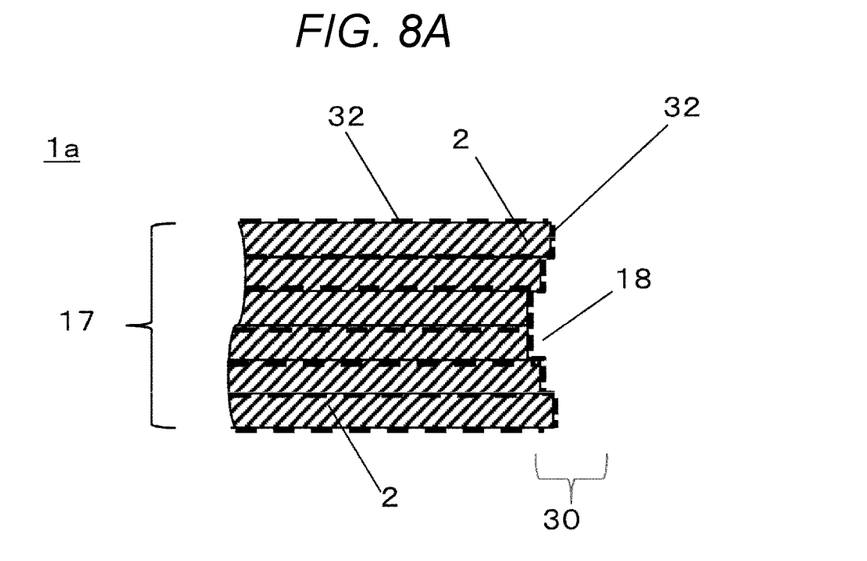
FIG. 8A is a cross-sectional view of a vicinity of an end surface of the laminate according to Embodiment 4 of the disclosure.
Figure 8B:
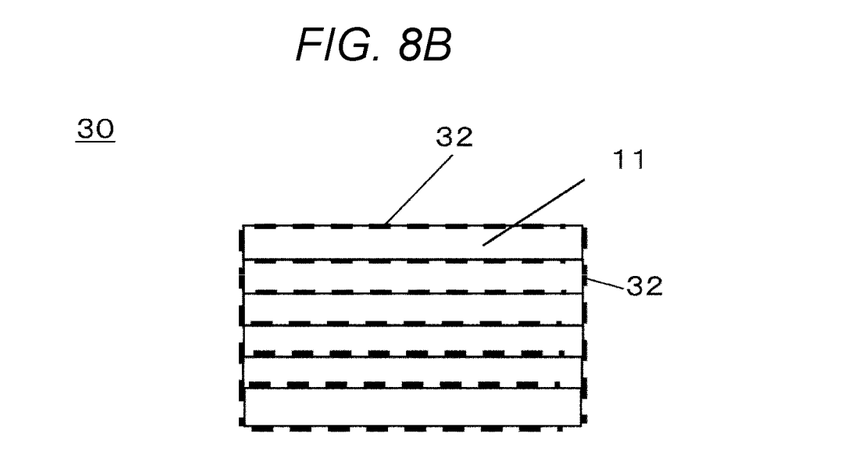
FIG. 8B is a front view of the vicinity of the end surface of the laminate according to Embodiment 4 of the disclosure.

FIG. 8A is a cross-sectional view of a vicinity of end surface 30 of laminate 17 after the heat treatment, and FIG. 8B is a front view of the vicinity of end surface 30 of laminate 17 after the heat treatment. When the heat treatment is performed while pressing laminate 14 the above and below, there is frictional resistance against contraction at the boundary between pressure plate 15 and laminate 14.

Under the heat treatment conditions under which nanocrystal grains are generated, amorphous thin strip member 1 itself generates heat and the heat is accumulated on the central side of laminate 14, so that the temperature rises, and the contraction factor on the central side also increases. Due to these influences, the contraction amount in the center becomes large and recess 18 exists sometimes on end surface 30 of laminate 17 after heat treatment.

In the motor shown in FIGS. 3A and 3B, operation failure occurs when end surface 30 and rotor 10 come into contact with each other. Therefore, as shown in FIG. 8A, if the shape has recess 18, thin strip component members 2 at both upper and lower ends of laminate 17 serve as a reference, and the shape is regulated. As a result, there is an advantage that the accuracy can be easily secured.

Laminate 14 is a magnetic laminate in which the plurality of plate-shaped thin strip components 2 of the same shape are laminated, and is a thin strip component having recess 18 over the entire side surface of the magnetic laminate. As for the size of thin strip component member 2, thin strip component member 2 located outside laminate 14 has a larger size.

Embodiment 5

Figure 9A:
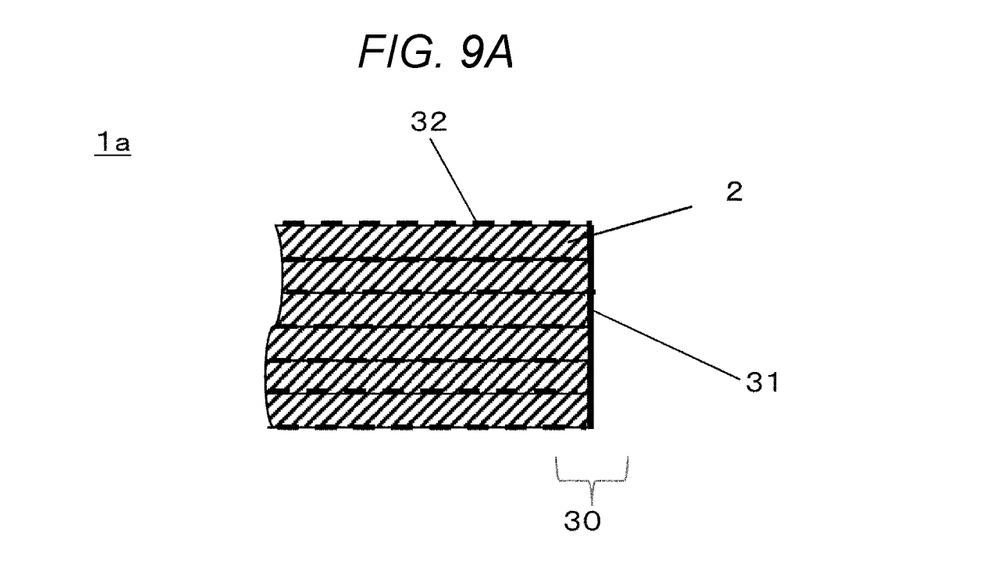
FIG. 9A is a cross-sectional view of a vicinity of an end surface of a laminate according to Embodiment 5 of the disclosure.
Figure 9B:
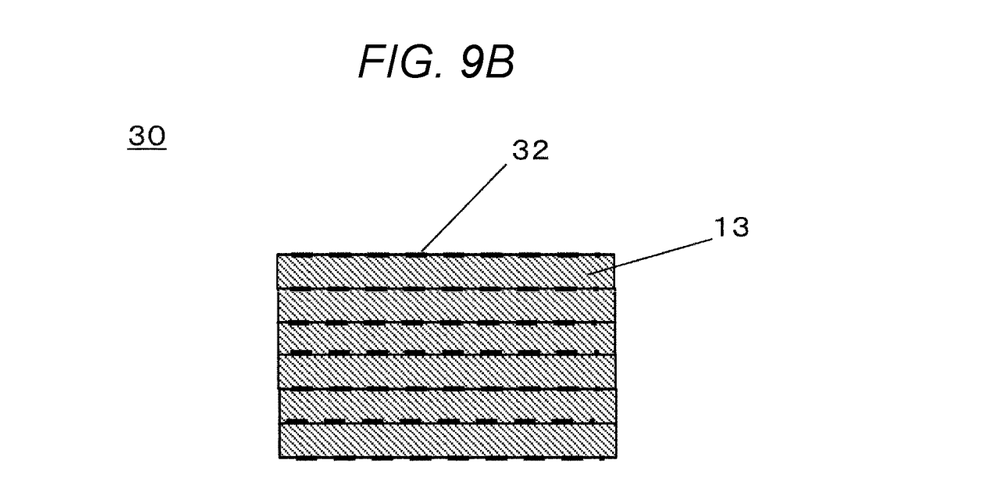
FIG. 9B is a front view of the vicinity of the end surface of the laminate according to Embodiment 5 of the disclosure.

FIG. 9A is a cross-sectional view of a vicinity of end surface 30 of teeth 1a of laminate 17 according to Embodiment 5 of the disclosure. FIG. 9B is a front view of the vicinity of end surface 30 of teeth 1a of laminate 17 according to Embodiment 5 of the disclosure. Items not described are the same as those in Embodiment 4. In Embodiment 5, laminate 17 of Embodiment 4 is further processed to form one plane on the side surface.

FIGS. 9A and 9B are different from FIGS. 8A and 8B in Embodiment 4 in that the surface of end surface 30 is cut to form one plane 31. Although thin strip component members 2 can be brittle due to the heat treatment, this process is possible because the entire or a portion of the interlayer of thin strip component members 2 are bonded to each other by oxide film 32 by performing the heat treatment while pressing in the device of FIG. 7.

Accordingly, thin strip component members 2 in the vicinity of end surface 30 are fixed and can be cut without being damaged. By the cutting process, the unevenness amount of end surface 30 decreases, and cutting trace 13 having metallic luster remains as seen from the front. Cutting trace 13 is a line-shaped unevenness. Accordingly, the accuracy of the gap distance between rotor 10 and end surface 30 is particularly improved, so that the motor efficiency is improved.

As a Whole

The above-described embodiments can be combined. For example, Embodiments 2 and 3 may be applied to the laminate produced in Embodiments 4 and 5.

Although teeth 1a have been mainly described, it can be similarly applied to other parts of thin strip component members 2.

The thin strip component is an example and can be applied to other structures and shapes.

According to the thin strip component, the laminate, the method for manufacturing thereof, and the motor of the disclosure, it is possible to improve the shape accuracy and the magnetic characteristics of thin strip component, and the motor characteristics. Furthermore, the laminate according to the disclosure can also be applied to applications of electronic components such as transformers, other than motors.

REFERENCE SIGNS LIST

1 AMORPHOUS THIN STRIP MEMBER
1a TEETH
1b FITTING HOLE
1c CORE BACK
2 THIN STRIP COMPONENT MEMBER
3 THIN STRIP COMPONENT
4 BOLT
5 SPRING WASHER
6 WASHER
7 NUT
8 METAL BASE
9 WINDING
a DIMENSIONAL VARIATION
b DIMENSIONAL VARIATION
10 ROTOR
11 OXIDE FILM
12 RESIN COATING LAYER
13 CUTTING TRACE
14 LAMINATE
15 PRESSURE PLATE
16 HEATER
17 LAMINATE
18 RECESS
30 END SURFACE
31 PLANE

What is claimed is:

1. A thin strip component which is a magnetic laminate in which a plurality of plate-shaped thin strip component members of the same shape are laminated, and has a recess over an entire side surface of the magnetic laminate, wherein the side surface is formed by ends of the plurality of plate-shaped thin strip component members.

2. The thin strip component of claim 1,
wherein a thin strip component member of the plurality of plate-shaped thin strip component members positioned outside the magnetic laminate has a larger dimension.

3. A thin strip component which is a magnetic laminate in which a plurality of plate-shaped thin strip component members of the same shape are laminated,
wherein a resin coating layer is formed on a side surface to which the thin strip component members are bonded, and the side surface is formed by ends of the plurality of plate-shaped thin strip component members.

4. The thin strip component of claim 3,
wherein one plane is formed on the side surface of the magnetic laminate.

5. A thin strip component which is a magnetic laminate in which a plurality of plate-shaped thin strip component members of the same shape are laminated,
wherein one plane is formed on a side surface of the magnetic laminate, and resin is positioned only between end portions of thin strip component members.

6. The thin strip component of claim 3,
wherein one plane is formed by covering a side surface of the magnetic laminate with resin.

7. A motor comprising:
the thin strip component of claim 1;
a plurality of coils disposed on the thin strip component; and
a rotor disposed between the plurality of coils.

8. The thin strip component of claim 1,
wherein an oxide film is present on the side surface.

9. The thin strip component of claim 1,
wherein an oxide film is disposed between the plurality of plate-shaped thin strip component members.

10. The thin strip component of claim 1, wherein the thin strip component has a T-shaped portion.

11. A motor comprising:
the thin strip component of claim 5;
a plurality of coils disposed on the thin strip component; and
a rotor disposed between the plurality of coils.

12. The thin strip component of claim 3,
wherein an oxide film is present on the side surface.
13. The thin strip component of claim 3,
wherein an oxide film is disposed between the plurality of plate-shaped thin strip component members.
14. The thin strip component of claim 3,
wherein the thin strip component has a T-shaped portion.
15. A motor comprising:
the thin strip component of claim 3;
a plurality of coils disposed on the thin strip component; and
a rotor disposed between the plurality of coils.
16. The thin strip component of claim 5,
wherein an oxide film is present on the side surface.
17. The thin strip component of claim 5,
wherein an oxide film is disposed between the plurality of plate-shaped thin strip component members.
18. The thin strip component of claim 5,
wherein the thin strip component has a T-shaped portion.

\* \* \* \* \*